US012626038B2

(12) United States Patent
Akhauri et al.

(10) Patent No.: US 12,626,038 B2
(45) Date of Patent: May 12, 2026

(54) SYSTEM FOR UNIVERSAL HARDWARE-NEURAL NETWORK ARCHITECTURE SEARCH (CO-DESIGN)

(71) Applicant: Intel Corporation, Santa Clara, CA (US)

(72) Inventors: Yash Akhauri, Uttar Pradesh (IN); Nilesh Jain, Portland, OR (US); Juan Pablo Munoz Chiabrando, Folsom, CA (US); Adithya M. Niranjan, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 1117 days.

(21) Appl. No.: 17/552,955

(22) Filed: Dec. 16, 2021

(65) Prior Publication Data
US 2022/0108054 A1      Apr. 7, 2022

(30) Foreign Application Priority Data

Sep. 29, 2021    (IN) .............................. 202141044206

(51) Int. Cl.
| | |
|---|---|
| *G06F 30/27* | (2020.01) |
| *G06F 30/30* | (2020.01) |
| *G06F 30/33* | (2020.01) |
| *G06F 111/06* | (2020.01) |
| *G06F 111/08* | (2020.01) |

(52) U.S. Cl.
CPC .............. *G06F 30/27* (2020.01); *G06F 30/30* (2020.01); *G06F 30/33* (2020.01); *G06F 2111/06* (2020.01); *G06F 2111/08* (2020.01)

(58) Field of Classification Search
None
See application file for complete search history.

(56) References Cited

U.S. PATENT DOCUMENTS

| | | | | |
|---|---|---|---|---|
| 12,105,612 | B1 * | 10/2024 | Vineyard ................ | G06F 11/34 |
| 2022/0019880 | A1 * | 1/2022 | Dasgupta ............... | G06N 3/063 |
| 2022/0147680 | A1 * | 5/2022 | Zehngut .................. | G06F 30/39 |

OTHER PUBLICATIONS

Zhang, Yongan, Yonggan Fu, Weiwen Jiang, Chaojian Li, Haoran You, Meng Li, Vikas Chandra, and Yingyan Lin. "DNA: Differentiable network-accelerator co-search." arXiv preprint arXiv:2010. 14778 (2020). (Year: 2020).*

(Continued)

*Primary Examiner* — Rehana Perveen
*Assistant Examiner* — Kyle H Tseng
(74) *Attorney, Agent, or Firm* — Akona IP PC

(57) ABSTRACT

An architecture search system evaluates a search space of neural network and hardware architectures with a plurality of candidate controllers. Each controller attempts to identify an optimized architecture using a different optimization algorithm. To identify a controller for the search space, the architecture search system samples subspaces of the search space having a portion of the neural network search space and a portion of the hardware search space. For each subspace, candidate controllers are scored with respect to the optimized design determined by the respective candidate controllers. Using the scores for the various candidate controllers across the sampled subspaces, a controller is selected to optimize the overall network architecture search space.

25 Claims, 10 Drawing Sheets

(56)          References Cited

OTHER PUBLICATIONS

Colangelo, Philip, Oren Segal, Alex Speicher, and Martin Margala. "Artificial neural network and accelerator co-design using evolutionary algorithms." In 2019 IEEE High Performance Extreme Computing Conference (HPEC), pp. 1-8. IEEE, 2019. (Year: 2019).*

Luo, Xiangzhong, Di Liu, Shuo Huai, Hao Kong, Hui Chen, and Weichen Liu. "Designing efficient DNNs via hardware-aware neural architecture search and beyond." IEEE Transactions on Computer-Aided Design of Integrated Circuits and Systems 41, No. 6 (2021): 1799-1812. (Year: 2021).*

Chen, Minghao, Jianlong Fu, and Haibin Ling. "One-shot neural ensemble architecture search by diversity-guided search space shrinking." In Proceedings of the IEEE/CVF conference on computer vision and pattern recognition, pp. 16530-16539. 2021. (Year: 2021).*

Schott, François, Dominique Chamoret, Thomas Baron, Sébastien Salmon, and Yann Meyer. "Performance measure and tool for benchmarking metaheuristic optimization algorithms." Journal of Applied and Computational Mechanics (2021). (Year: 2021).*

"Aw_nas: A Modularized and Extensible NAS Framework" https://github.com/walkerning/aw_nas; 10 pages (Oct. 11, 2021).

Choi., K., et al., "DANCE: Differentiable Accelerator/Network Co-Exploration," Department of Computer Science, Yonsei University, Department of Artificial Intelligence, Yonsei University, Department of Electrical and Computer Engineering, Seoul National University; 7 pages (Feb. 16, 2021).

Hu., S., et al., "DSNAS: Direct Neural Architecture Search without Parameter Retraining," 10 pages (Apr. 1, 2020).

Moreau, T., et al., "A Hardware-Software Blueprint for Flexible Deep Learning Specialization," Paul G. Allen School of Computer Science & Engineering, University of Washington and Shanghai Jiao Tong University, 7 pages (Apr. 23, 2019).

Zhang, Y., et al., "DNA: Differentiable Network-Accelerator Co-Search," 13 pages (Oct. 28, 2020).

* cited by examiner

Output Layer 930

Hidden Layer(s) 920

Input Layer 910

SYSTEM FOR UNIVERSAL HARDWARE-NEURAL NETWORK ARCHITECTURE SEARCH (CO-DESIGN)

CROSS-REFERENCE TO RELATED APPLICATIONS

The present application claims priority to Indian Provisional Patent Application No. 202141044206, filed on Sep. 29, 2021, the contents of which are hereby incorporated by reference in its entirety.

TECHNICAL FIELD

This disclosure relates generally to optimization of computer model architectures, and particularly to optimization of computer model architectures jointly with specialized hardware executing the computer model.

BACKGROUND

The industry has been facing challenges in scaling the deployment of AI algorithms (e.g., computer models) on a range of hardware. While hardware-aware model architecture search alleviates the issue of optimization of a neural network on a single hardware platform, there is a shift towards driving the performance of hardware architectures further with custom and configurable accelerators (ASICs, FPGAs) tailored for deep learning. However, research in automatically optimizing for both hardware and computer model parameters is still in early stages, with most current industry approaches being manual. In addition, there are additional challenges in making approaches generalizable, rather than to address specific, narrower challenges.

As a result, it is a challenge to develop an approach that converges effectively for a broad range of hardware accelerators, addresses highly irregular spaces, generalizes to computer model and hardware design, allows arbitrary design and evaluation methods, or allow for multi-workload optimization.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Overview

Figure 1:
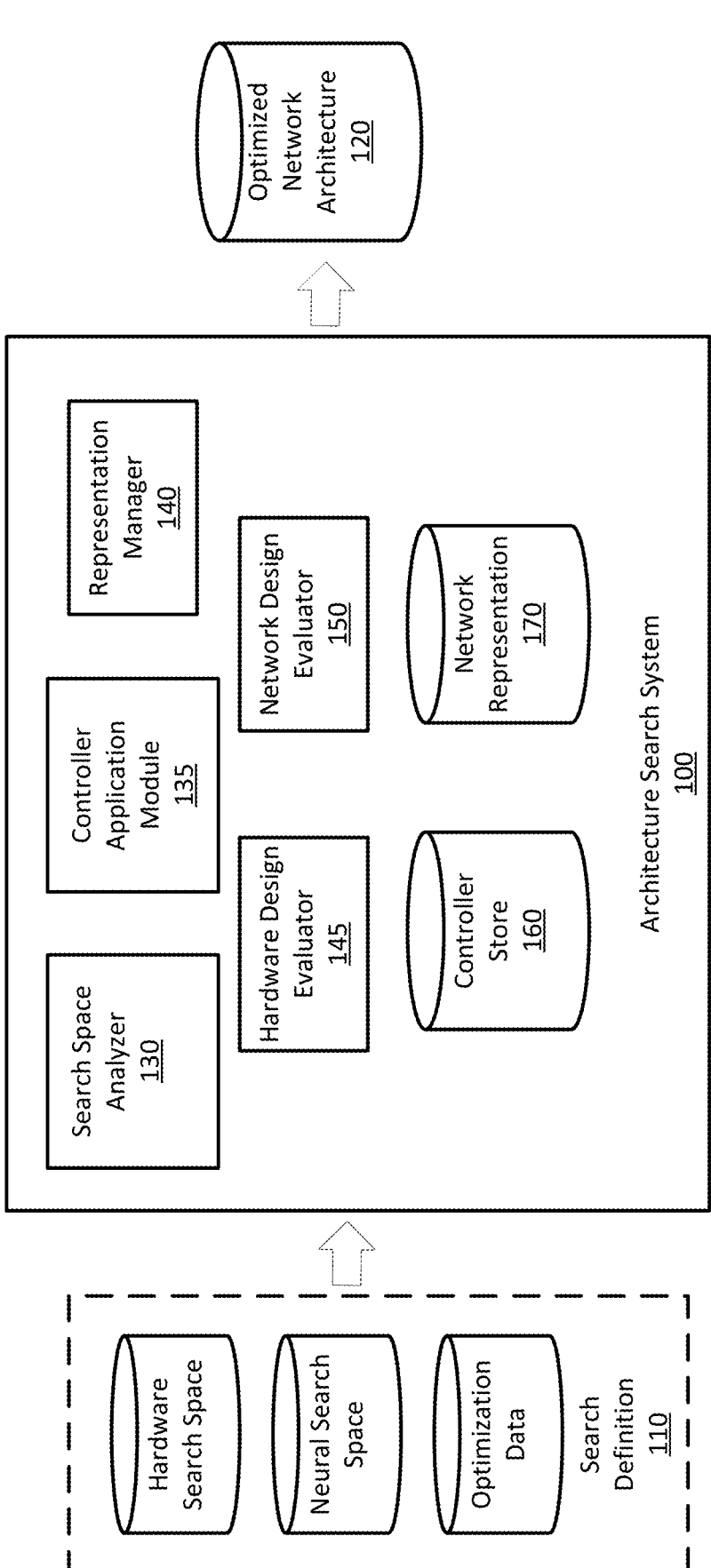
FIG. 1 is an example system for performing joint computer model and hardware architecture search, according to some embodiments.

Described herein is a system that supports automatic optimization of any given input hardware ("HW") and neural network ("NN") search spaces for arbitrary tasks. Although the term "neural network" is used herein, embodiments of the present invention apply more generally to additional types of computer models. This innovation can extend optimization to both the neural network and hardware jointly as well as only to individual dimensions (neural network or hardware) depending on the user's needs. Such a system is fully configurable in its interaction between its components and, which are further easily extendable to support new components. This contrasts with all present frameworks, which focus on expert users to tailor the components of the framework to suit their requirements. Described herein are search space analyzers thus provide approaches that automatically determine optimizations which do not require manual experts to design such frameworks, as well as interfacing units that automate the flow based on the search space analyzers' decisions.

This innovation enables the end user to make optimal decisions without hardware or computer model (e.g., neural network) architectural expertise or manual tuning, tasks which require significant engineering cost and domain knowledge in both neural network and hardware design.

An end-to-end automated general Hardware-Neural Architecture Search solution requires a combination of efficient methods for manipulating and representing neural network and hardware architectures, and methods to recognize the most efficient algorithm to apply for exploring the chosen search space. Described herein is a system that integrates a wide array of optimization algorithms (e.g., optimization controllers), interfacing these methods along with search space analyzers to recognize the best optimization algorithm to follow. Such an end-to-end solution significantly improves generalizable AI optimization systems.

To evaluate various candidate optimization controllers, search subspaces are sampled of the complete search space. Within the search subspaces, a candidate optimization controller is applied to determine an optimized design according to that particular candidate controller. That design may then be evaluated to determine the efficacy of the candidate controller within that particular search subspace. In one embodiment, multiple such candidate controllers are evaluated for each search subspace and the resulting controller optimized designs may be compared to one another or with an optimal design as determined by exhaustive enumeration to score the performance of the candidate controllers within that search subspace. In another embodiment, individual controllers are evaluated in an exploration order of expected performance for the controllers, such that the first controller that performs well in the exploration order is scored as the preferred candidate controller for that search subspace. The evaluation of candidate controllers for a search subspace may be repeated for a plurality of such subspaces to determine a candidate controller that performs well across many search subspaces and select that candidate controller for optimizing the search space as a whole. As a result, the search space analyzer allows allow for a wide variety of search spaces and optimization controllers to be evaluated efficiently while ultimately selecting an effective controller to optimize the search space.

For purposes of explanation, specific numbers, materials, and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

In the following detailed description, reference is made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. The meaning of "a," "an," and "the" include plural references. The meaning of "in" includes "in" and "on."

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The disclosure may use perspective-based descriptions such as "above," "below," "top," "bottom," and "side"; such descriptions are used to facilitate the discussion and are not intended to restrict the application of disclosed embodiments. The accompanying drawings are not necessarily drawn to scale. The terms "substantially," "close," "approximately," "near," and "about," generally refer to being within +/−20% of a target value. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

Workflow for Hardware-Neural Architecture Search

FIG. 1 is an example system for performing joint computer model and hardware architecture search, according to some embodiments. The architecture search system 100 searches for an optimized neural network and hardware architecture given a particular search definition 110. The search definition 110 describes various constraints of the parameters for performing a neural network and/or hardware search. The architecture search system 100 uses the defined hardware and neural search space in the search definition 110 to determine an optimized network architecture 120. The architecture search system 100 analyzes the search space by determining the performance of various architecture optimization techniques, called "controllers," on subsamples of the overall search space. By sampling portions of the overall search space and determining performance of the controllers on the search subspaces, the architecture search system 100 determines a controller to be used to optimize the entire search space. This permits the architecture search system 100 to evaluate a large number of controllers (e.g., architecture optimization algorithms) and identify the controller that finds the best solution for the defined search space. The resulting optimized network architecture thus refers to the optimization of hardware and neural network architectures based on the search definition 110. Thus, the "network architecture" may refer to both the logical neural network architecture (sometimes referred to simply as "neural" or "NN") and the hardware architecture systems on which the neural network may be executed. Applying the selected controller enables the architecture search system 100 to determine an optimized network architecture 120 from a variety of different and heterogeneous search spaces and search definitions.

As discussed below with respect to FIGS. 8-9, computer models typically include parameters that are used to process inputs to predict outputs. Such computer models may be iteratively trained to learn parameters, including weights, for predicting various outputs based on input data. As discussed further in FIG. 9, individual layers in a neural network may receive input activations and process the input activations to generate output activations of the layer. The specific set of layers, interactions between layers, input representations, etc., can vary from implementation to implementation, and different combinations of neural network architectures and hardware accelerators may perform differently based on different tasks to be performed. Thus, computer model architectures that may be developed using the disclosed approaches include the types discussed below, including various types of neural networks and hardware accelerators. In addition, while generally discussed herein as related to neural networks, other types of computer models with variable architectures may also be analyzed and developed using the techniques discussed herein.

The search definition 110 describes a hardware search space, neural search space, and additional optimization data. The hardware search space describes the various architectures that may be used for physically executing a neural network in circuitry with various memory and processing elements. In various embodiments, the hardware may include various types of accelerators, including tensor processing units, specialized parallel processing hardware, multiply-and-accumulate (MAC) circuits (programmable or hardcoded), registers and data storage, pipelining and coordination among these elements and so forth. As further examples, the hardware search space may include accelerator design choices like activation buffer size, tiling choices, and so forth.

The neural search space describes the possible architectures for the computer model (e.g., a neural network). The neural search space may include the number of layers of the network, the dimensions of activations for each layer, the connectedness of the layers, the types of network layers at particular places in the network (e.g., convolutional layers, pooling layers, fully-connected layers, recurrent layers, etc.), representation of inputs for a network, common preprocessing tasks for a given type of model (e.g., convolutions for edge detection in computer vision applications, embedding or other compact input representations for sparse data inputs), and so forth.

The optimization data may include additional information for refining and evaluating potential network designs. For example, the optimization data may include a dataset for analysis along with a specification of the task and definition of a loss for the task. For example, a computer vision task for object identification may include a dataset of images having labeled object classes, with a task to be learned by the neural network of correctly predicting the class for a portion of an image. The task loss may be defined based on the accuracy of the model with respect to cross-entropy loss of the classes within the model. The task loss thus represents one objective of the computer model and may be used to measure the accuracy of the computer model with respect to its designed task, and may be used in training the model and similarly in searching for an architecture with appropriate performance. In various embodiments, the optimization data does not include training data, e.g., for circumstances in which the controller may estimate accuracy or efficacy of "zero-shot" learning. The discussion above is one example of a dataset, task, and task loss; in other examples the search definition 110 may specify various other types of tasks and related datasets and a defined task loss according to the particular needs of the model.

In addition to the task loss, the optimization data may also specify an objective for the optimization of the network architecture, of which the task loss may be one component. For example, the extent of a task loss for a particular network architecture may represent the accuracy of the network architecture, but which may be one component of the overall evaluation of the network architecture. For example, the objective may also specify factors relating to the required area (e.g., on a circuit board), execution time, power consumption, fabrication costs, buffer size, reprogrammable vs. fixed-value designs, etc., which may also be considered in addition to the accuracy of the model. The defined objective may provide the relative weighing and utility of the various considerations in evaluating the practical success of a particular network architecture. Stated another way, the objective may include factors related to the computer model's accuracy, which may generally be evaluated with respect to the neural search space and also affected by the particular hardware implementation, and additional factors related to the hardware architecture, such that the overall objective considers the predicted computer model's accuracy in addition to hardware-related performance characteristics.

The architecture search system 100 includes various components for analyzing the search space. As a general overview, the architecture search system 100 includes a search space analyzer 130 that orchestrates exploration of the search space and the use of different controllers (i.e., exploration/optimization algorithms) and evaluation tools for exploring the search space and determining a particular controller that may most effectively determine an optimum design from the search space as a whole. To evaluate performance of various controllers, the search space analyzer 130 samples subspaces of the search space (including a portion of the hardware search space and a portion of the neural search space) and directs the controller application module 135 to apply controllers to optimize the search subspace according to individual optimization controllers, e.g., as stored in controller store 160. Based on the results of the controllers as applied to several search subspaces, the search space analyzer 130 selects a controller to optimize the search space and generate an optimized network architecture 120. The controller application module 135 may thus apply the various controllers (i.e., individual optimization algorithms) to a particular search subspace to determine an optimized architecture as determined by a controller.

Figure 2:
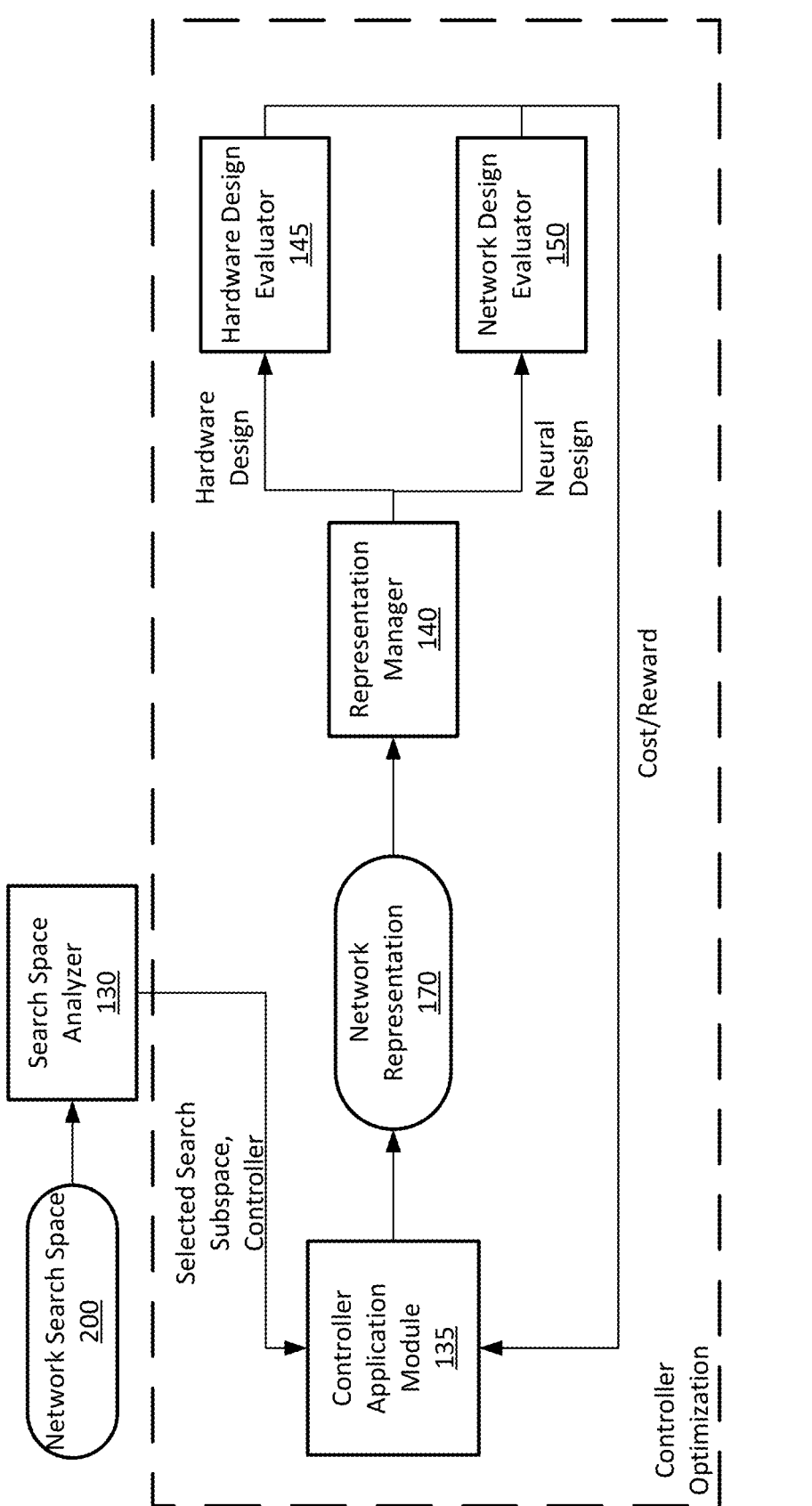
FIG. 2 provides a data flow overview of applying a controller to a subspace according to one embodiment.

FIG. 2 provides a data flow overview of applying a controller to a search subspace according to one embodiment. FIG. 2 provides one example embodiment of the interaction between the components shown in FIG. 1. Additional details, examples, and discussion of the various components are provided below. The search space analyzer 130 receives the target search space (neural network AND/OR hardware search space). The search space analyzer 130 then samples sub-spaces from the entire search space, and trains small optimization models using candidate controllers and compares it to the optimal design in the search subspace. The particular controller to be evaluated for the search space may be determined and/or selected from the controller store 160. The controller store 160 may store information describing individual controllers that may be selected and used for architecture optimization.

As shown by FIG. 2, to evaluate a controller within a search subspace, the search space analyzer 130 may select a search subspace and a particular candidate controller for evaluation and provide it to the controller application module 135 for executing the candidate controller on the search subspace. To determine and evaluate an optimal architecture, by a controller, the controller may generate a network representation 170. The network representation 170 may include various types of designs, including probabilistic and population-based designs as further discussed below. The representation manager 140 may process the representation to a particular hardware and neural design that may be evaluated based on the particular network representation 170 generated by the controller. For example, the representation manager 140 may sample from a probabilistic representation to identify a specific design of the network. The particular hardware and neural design identified by the representation manager 140 may then be evaluated by the hardware design evaluator 145 and network design evaluator 150 to generate evaluations for design revision by the controllers. The evaluations may then be provided as a cost/reward to the representation manager 140 in some embodiments for further sampling of the same network representation 170 or may be provided to the controller application module 135 for application of the controller to generate a new network representation based on the cost/reward feedback of the evaluators. The cost/reward for a particular network may also be determined based on the optimization data and the overall objective defining the combination of hardware/neural network evaluations. As further discussed below, each of the various components may include various algorithms and approaches for assessing and modifying a network architecture, which may be modularized and used by various controllers for determining an optimal design according to the controller's optimization algorithm and the defined optimization data. The particular details of the controller may also define specific evaluation protocols or algorithms for a design, and such parameters may also be defined by the search space analyzer 130. For example, the search space analyzer 130 may specify the use of a particular network evaluation metric for accuracy of a model based on the defined objective in the search definition.

Figure 6:
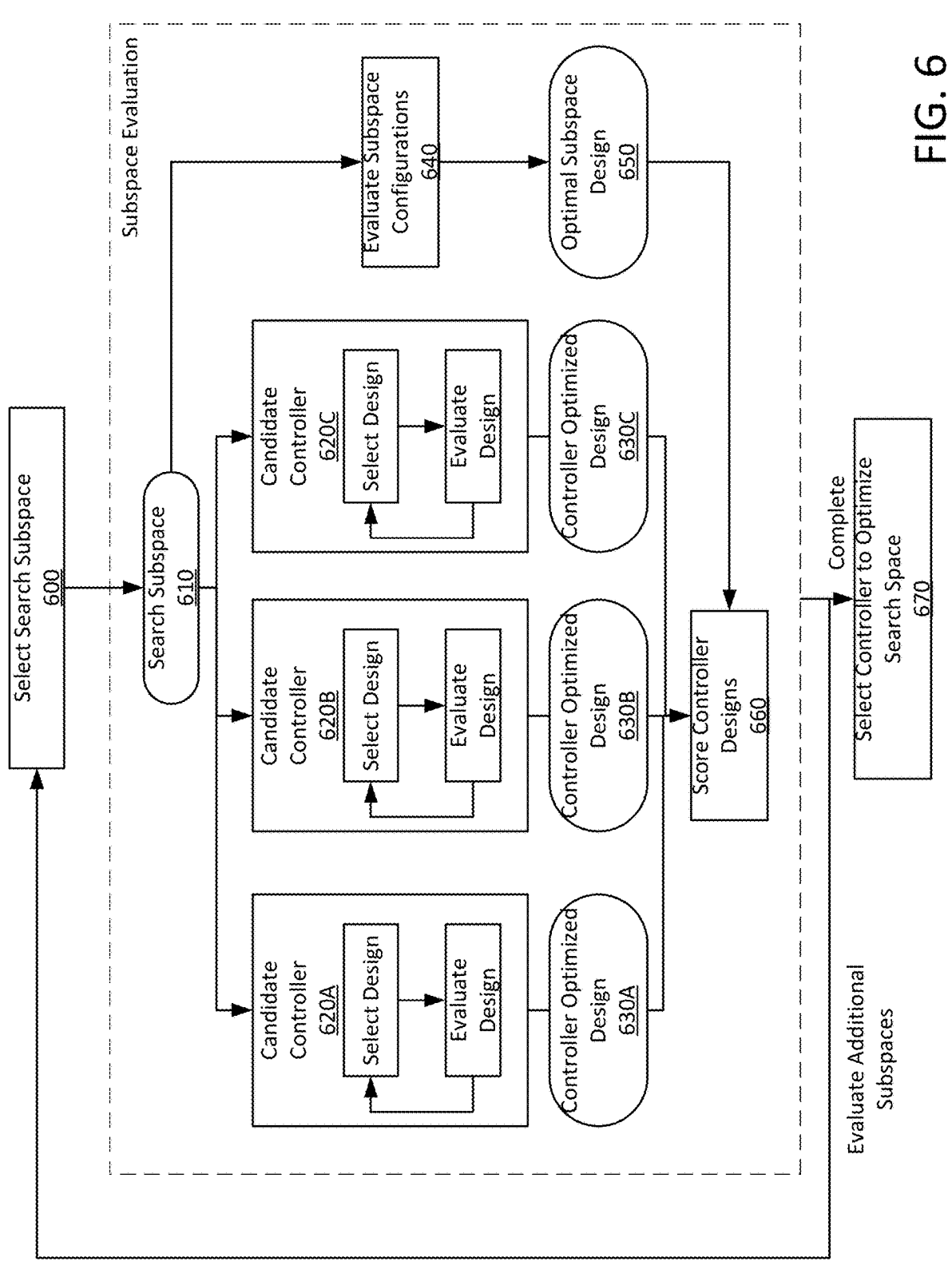
FIG. 6 shows an example flow for evaluating candidate controllers for a search space, according to one embodiment.
Figure 7:
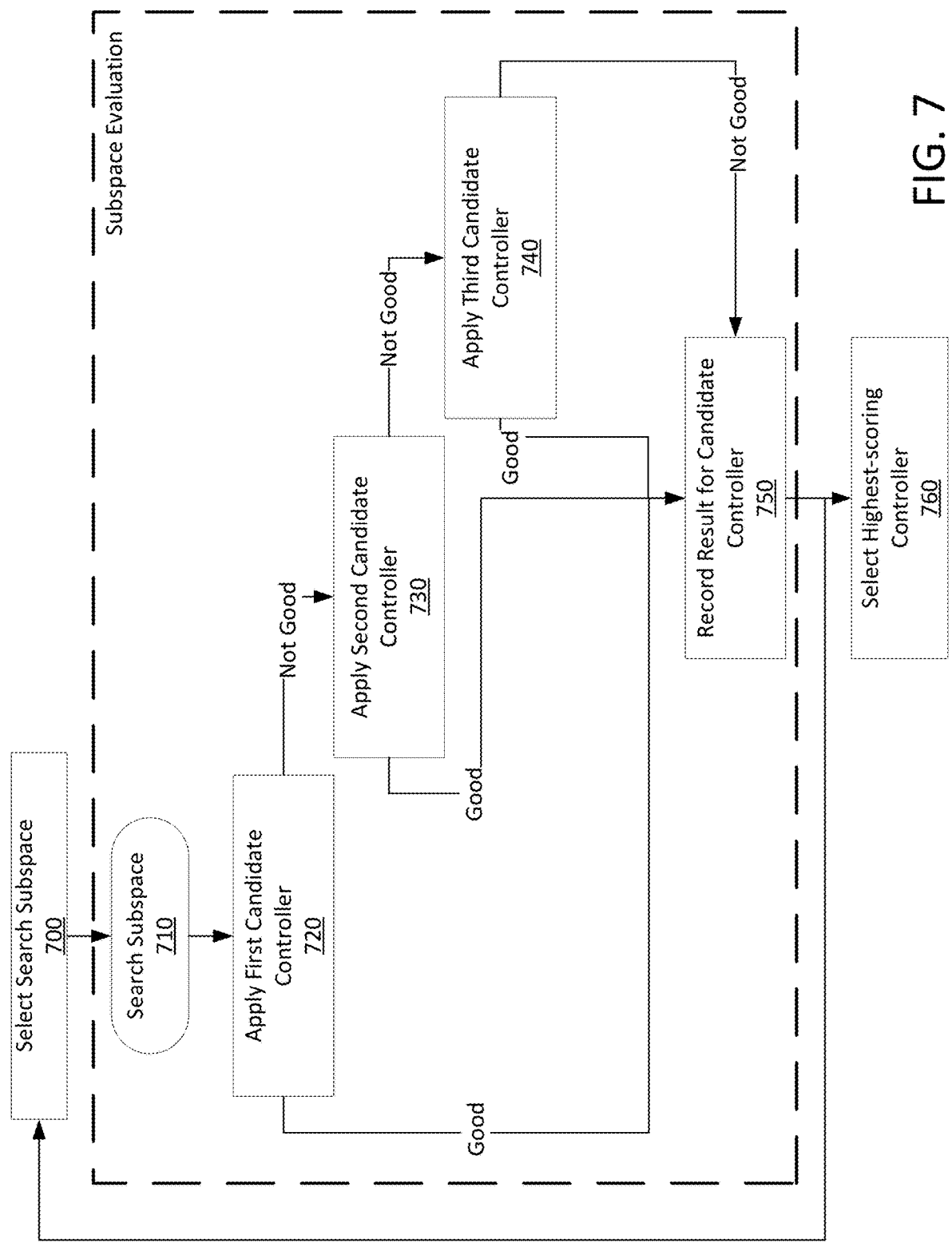
FIG. 7 shows an additional example for search space exploration of a plurality of candidate controllers using an exploration order, according to one embodiment.

Returning to the components of FIG. 1, after a number of iterations of the candidate controller, the design generated by a particular controller is considered the controller-optimized design within that search subspace for that candidate controller. The candidate controllers can thus be evaluated by the search space analyzer 130 with respect to performance within the search subspace based on the controller-optimized design of the respective candidate controllers. After sufficient iterations of evaluating subspaces of the search space, the most consistently performing controller (as determined by a selected metric, such as the defined objective in the search definition 110) is used for optimizing the neural network AND/OR hardware search space (based on which search space was provided as input to the analyzer). Additional approaches for evaluating candidate controllers is discussed further below with respect to FIGS. 6 & 7, according to various embodiments. FIGS. 6 and 7 illustrate two embodiments for analyzing the search space with scoring of several controllers (FIG. 6) and with an exploration order (FIG. 7), although additional models may be used. As an additional approach, the search space analyzer 130 may accumulate experience over time on a range of search spaces as well as with heuristic analysis of the search space to decide an optimization controller to use for a particular search space or a particular search subspace.

The search space analyzer 130 may combine results from a controller using a selected metric, which may concatenate the decisions from other evaluations or apply a more complex decision block based on the search definition 110. Further, the search space analyzer 130 can also maintain a database of decisions to improve the efficiency of search space exploration. That is, the search space analyzer 130 may characterize various search subspaces and record which controllers perform well on which types of search subspaces and/or are selected for which types of search spaces. This historical data may be used to optimize selection of controllers for further search spaces and within individual search subspaces based on the historical performance. As one example, the search space analyzer may evaluate candidate controllers in an exploration order based on the expected efficacy of the candidate controllers. Rather than evaluate every candidate controller, the exploration order may be used to evaluate the candidate controllers based on the expected success of the controllers, such that the controller expected to yield high-quality results is evaluated first, and additional controllers are evaluated when the controller currently being evaluated does not yield a good result. This may also be considered a decision tree in which the candidate controllers are evaluated according to the decision tree processes.

The controller application module 135 receives the output of the search space analyzer 130. Based on the search subspace and controller selected by the search space analyzer 130, the controller application module 135 applies the optimization algorithm (e.g., a specific "controller") within the designated search space/subspace. The controller application module 135 may use the additional components of the architecture search system 100 for exploring and evaluating the search subspace according to the applied controller.

Based on the designated controller from the search space analyzer, the controller application module 135 may select and combine individual optimization algorithms for the neural network and hardware spaces as suggested by the search space analyzer 130 and interfaces these controllers to generate a joint controller for optimizing the search subspace. The controller application module 135 is thus programmed to support controller interfacing for a wide array of algorithms to generate network representations for analysis and further exploration.

The network representations 170 may provide various ways for representing the specific designs generated by the controller for evaluation and further refinement. The network representation from the controller may be represented as a specific, discrete ("discretized") design (e.g., a precisely defined NN or HW configuration), may be a probabilistic distribution of designs, or may be a population of designs (e.g., for a genetic algorithm), among possible design representations. Depending on the controller being used, the particular type of representation for the neural network and the hardware design may also vary. For example, a controller implementing a genetic algorithm may generate a representation that includes a population of designs, while a controller implementing a differentiable algorithm may generate a discretized design from which differentiable gradients can be determined.

Figure 3:
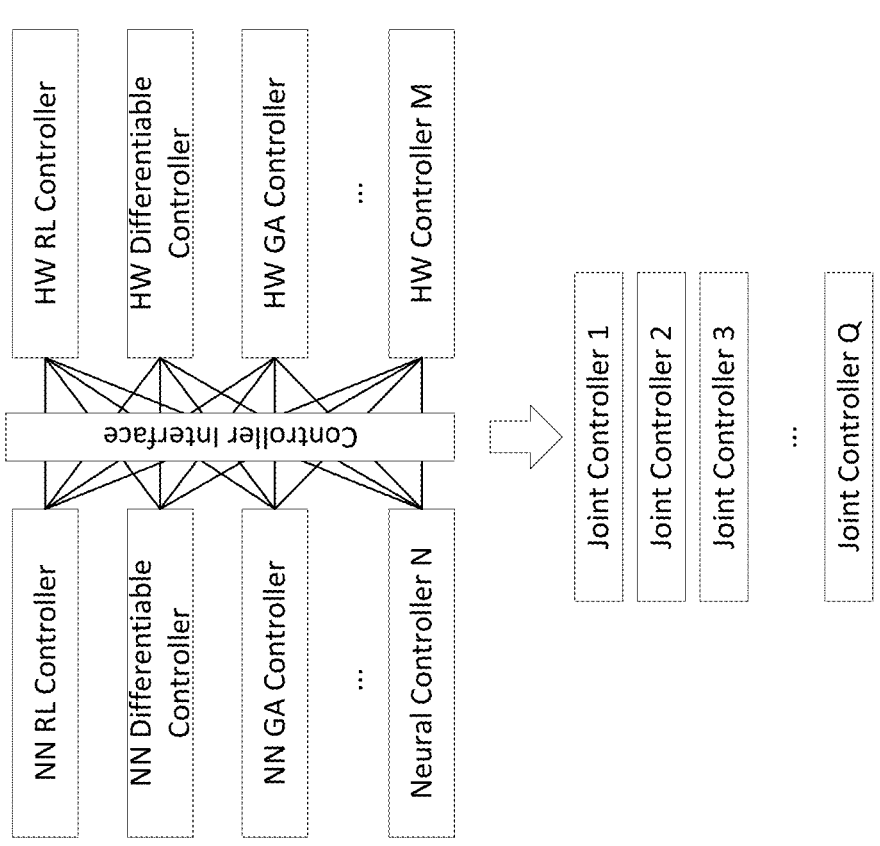
FIG. 3 shows an example of controller interfacing between various neural network controllers and hardware controllers.

FIG. 3 shows an example of controller interfacing between various neural network controllers and hardware controllers. As shown in FIG. 3, various individual search algorithms (controllers) may be developed for neural networks and hardware search that may each perform well in different types of search spaces. FIG. 3 depicts some examples of how different Hardware and Neural Architecture search algorithms can be implemented with a controller interface implemented by the controller application module 135 to generate a set of joint controllers that may be evaluated and used to optimize a search subspace or the overall search space. That is, the joint controllers may be used as the candidate controllers for exploring search subspaces. The neural controllers and hardware controllers may implement a variety of algorithms for exploring the relevant search space. For example, the neural network controllers may include controllers implementing a differentiable search algorithm, a reinforcement learning (RL) search algorithm, a genetic algorithm (GA), evolutionary algorithm (EA) and other neural search algorithms and various combinations of these, including reinforcement learning combined with a local genetic algorithm (RL+local GA), or a genetic algorithm including evolutionary elements (GA/EA). Similarly, the hardware controllers may also include a differentiable search algorithm, RL search algorithm, GA search algorithm, EA algorithm, Multi-layer Perceptron (MLP) and other search algorithms, including various combinations of these. The controller application module 135 may use or generate combinations of these as joint controllers for optimizing the hardware and software jointly in exploring a search space. For example, a NN RL controller may be interfaced with a HW differentiable controller, or a NN GA controller may be interfaced with a HW RL controller with a local GA. The interfacing between controllers may describe the particular representation generated by each controller and the ways in which iterative network representations are generated by the combined joint controller, for example whether the hardware or neural network representation is modified first or whether they are jointly modified. In some embodiments, the combinations of controllers may be automatically generated to interface types of controllers together. Joint controllers may also be manually developed/ programmed alone or in combination with automatically-generated joint controllers. For example, such controllers may include NASCHA (Neural Architecture Search for Configurable Hardware Accelerators), DNA (differentiable network-accelerator co-search), DANCE (Differentiable Accelerator/Network Co-Exploration), ConfuciuX, or DSNAS (Direct Neural Architectural Search).

Figure 4:
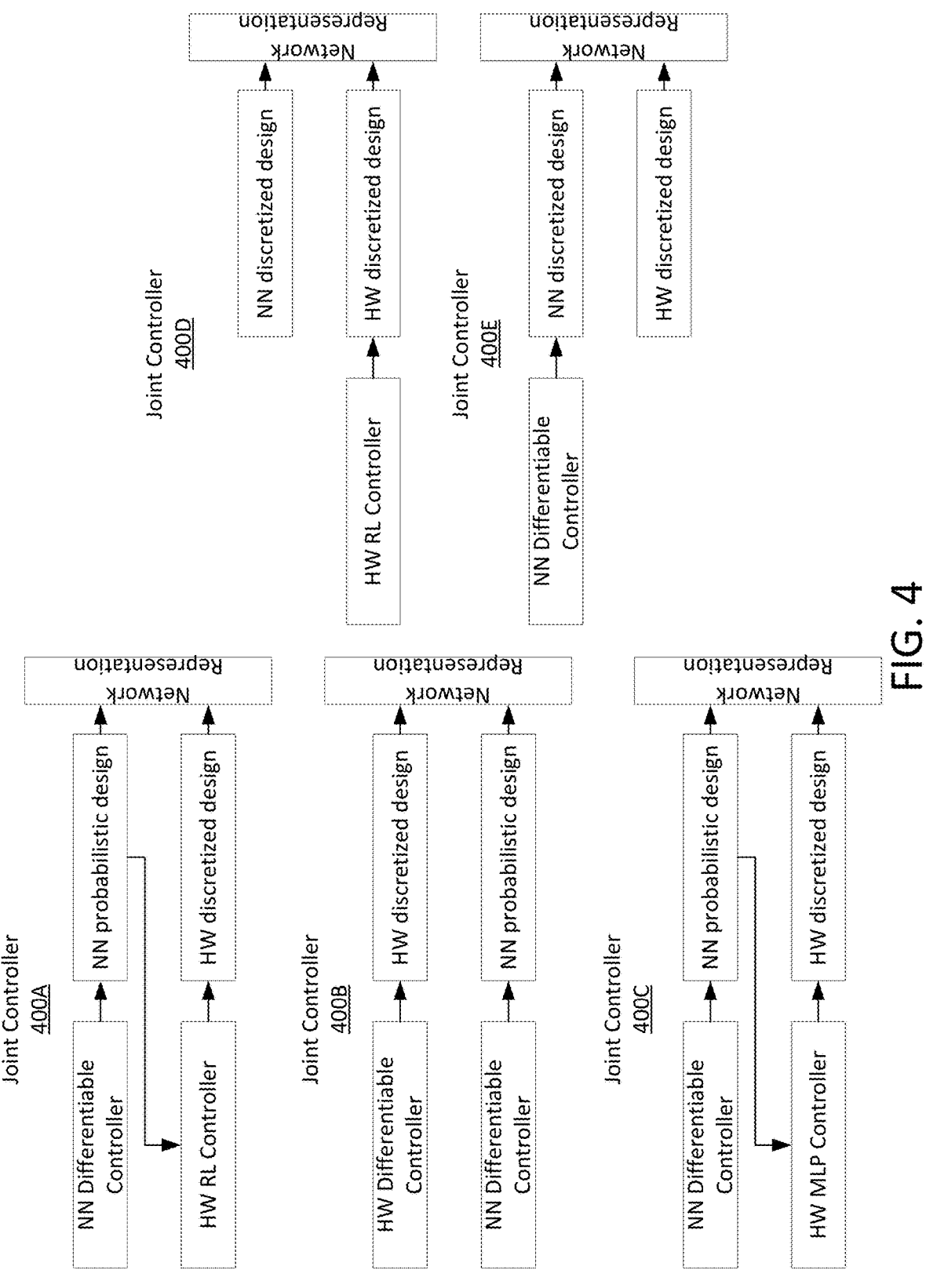
FIG. 4 provides examples of joint controllers that illustrate example relationships between various neural network and hardware controllers and the generated network representations.

FIG. 4 provides examples of joint controllers 400A-E that illustrate example relationships between various neural network and hardware controllers and the generated network representations.

In a first example of a joint controller 400A, a neural network differentiable controller generates a neural network probabilistic design. A hardware reinforcement learning controller receives the NN probabilistic design and generates a discrete hardware design. The neural network probabilistic design and hardware discretized design are provided as the network representation of the design to be evaluated (and from the evaluation to be further refined).

In a second example of a joint controller 400B, a HW differentiable controller generates a HW discretized design, and a NN differentiable controller generates a NN probabilistic design. The HW discretized design and NN probabilistic design are provided as the network representation of the design to be evaluated.

In a third example of a joint controller 400C, a NN differentiable controller generates a NN probabilistic design and a HW MLP controller interfaces with the NN probabilistic design to generate a HW discretized design. The NN probabilistic design and HW discretized design are the network representations.

In a fourth example of a joint controller 400D, a NN design may be discretized and fixed during exploration of a HW design. In this example, a HW RL controller generates a HW discretized design for evaluation with the NN discretized design. The HW RL controller in this example may receive and apply feedback based on metrics of evaluating the NN on the HW discretized design. Stated another way, the HW controller is aware of the NN design for which the HW is designed. The joint controller 400D may also be used in conjunction with a NN controller that generates the NN discretized design used with the HW RL controller.

In a fifth example of a joint controller 400E, the HW design may be discretized and fixed during exploration of a NN design. In this example, a NN differentiable controller generates a discretized design for evaluation with the HW discretized design. In this example, the NN controller is aware of the HW design for which the NN is optimized.

In additional examples, the design of the neural and hardware architectures may be jointly but alternately developed. For example, the examples of joint controller 400D and 400E may be combined, such that a number of iterations may be performed to optimize a HW design while a NN design is fixed, after which the HW design may be fixed while the HW design is optimized for a number of iterations. These optimizations may alternate to jointly optimize both designs.

The examples of FIG. 4 thus show the utility of the search space analyzers and interfaces, as through these two elements, the system may adapt to arbitrarily complex/novel NN-HW search strategies. FIG. 4 does not imply that this disclosure is limited to any set of methodology, rather has examples of controllers that may be used by the architecture search system 100 as controllers for exploring the search subspace.

After generation of the HW and NN representations, the representations may be further combined or concatenated by a representation interface before further evaluation.

Returning to FIG. 1, the representation manager 140 routes the NN and HW design to the required evaluators based on the particular controllers and the loss definition and objectives provided by the search space analyzer and/or the search definition 110. The hardware design evaluator 145 and network design evaluator 150 may be capable of performing a wide variety of evaluation functions, and depending on the specific evaluations required, different information from the network representations may be required. For example, if evaluating things such as latency as the objective, the representation manager 140 may send both a NN and HW design to the hardware evaluator. For metrics such as chip area, it may not need to send the NN design to the hardware evaluator.

The representation manager 140 may also perform management of the representations before sending a design to the evaluators. As one example, the representation manager 140 may provide the evaluator with hardware design points. It may do intermediate steps such as hardware mutations, hardware design morphism or sample hardware from a probability distribution for evaluation. This may provide, for example, specific hardware designs for evaluation from a representation of a probabilistic HW design or from a population of HW designs. Likewise, the representation manager 140 may perform similar functions for the neural network representation. For example, the representation manager may perform NN mutations, sample a specific NN design from a probabilistic representation (e.g., from a SuperNet), or perform morph or mutation functions to implement genetic or evolutionary functions on a NN population.

The hardware design evaluator 145 receives the hardware and/or neural network design population/samples and provides evaluation of the hardware design. The particular evaluation methods applied by the hardware design evaluator 145 may be based on the search definition 110, the search space analyzer 130, or the particular controller applied by the controller application module 135. The hardware design evaluator 145 may thus include a large number of evaluation functions to be applied to evaluate the hardware according to the needs of a particular search space or controller evaluation. The hardware design evaluator 145 may thus provide a "library" of particular evaluation functions to be flexibly used as required. The hardware evaluations may include a differentiable function such as a trained MLP for hardware-neural network evaluation, or analytical simulation estimators or actual RTL simulation of the design choice. As such, the hardware design evaluator may include a hardware simulator to develop and evaluate the design with respect to various performance or other metrics, such as circuit area, power, latency, etc. This may yield a set of hardware costs evaluating the hardware design.

The network design evaluator 150 similarly receives the neural network design population/samples and evaluates the performance of NN samples. The particular evaluation methods applied by the network design evaluator 150 may be defined based on the search definition 110, the search space analyzer 130, or the particular controller applied by the controller application module 135. As with the hardware design evaluator 145, the network design evaluator 150 may include a large number of evaluation functions to be applied to evaluate the neural network design according to the needs of a particular search space or controller. The network design evaluator 150 thus may provide a library of evaluation functions usable according to the particular needs of a controller or search space. In various embodiments, the neural network may be evaluated by first fine-tuning the samples, training from scratch, and evaluating on the test set or using accuracy predictors to estimate the neural network performance. That is, in some embodiments the network design evaluator 150 may at least partially train parameters for the neural design based on the training data, task, and loss definition for the network (e.g., as defined by the search definition). This may permit an evaluation of the neural architecture's accuracy on relevant data. In other examples, the accuracy may be estimated with look-up tables or with analytical estimators, such as a trained MLP. This may yield a set of neural network costs evaluating the efficacy and accuracy of the network.

After evaluation by the hardware design evaluator 145 and network design evaluator 150, a combined cost/loss may be determined. This may be performed by a distinct module or by the search space analyzer 130 or controller application module 135 in evaluating a particular design. The combined loss function may vary largely based on whether the evaluator is differentiable and based on the particular controller selected for optimization. In addition, the combined loss may be based on the defined objective in the search definition, such that the combined score attempts to optimize a design relative to the objective function in the search definition 110.

Figure 5:
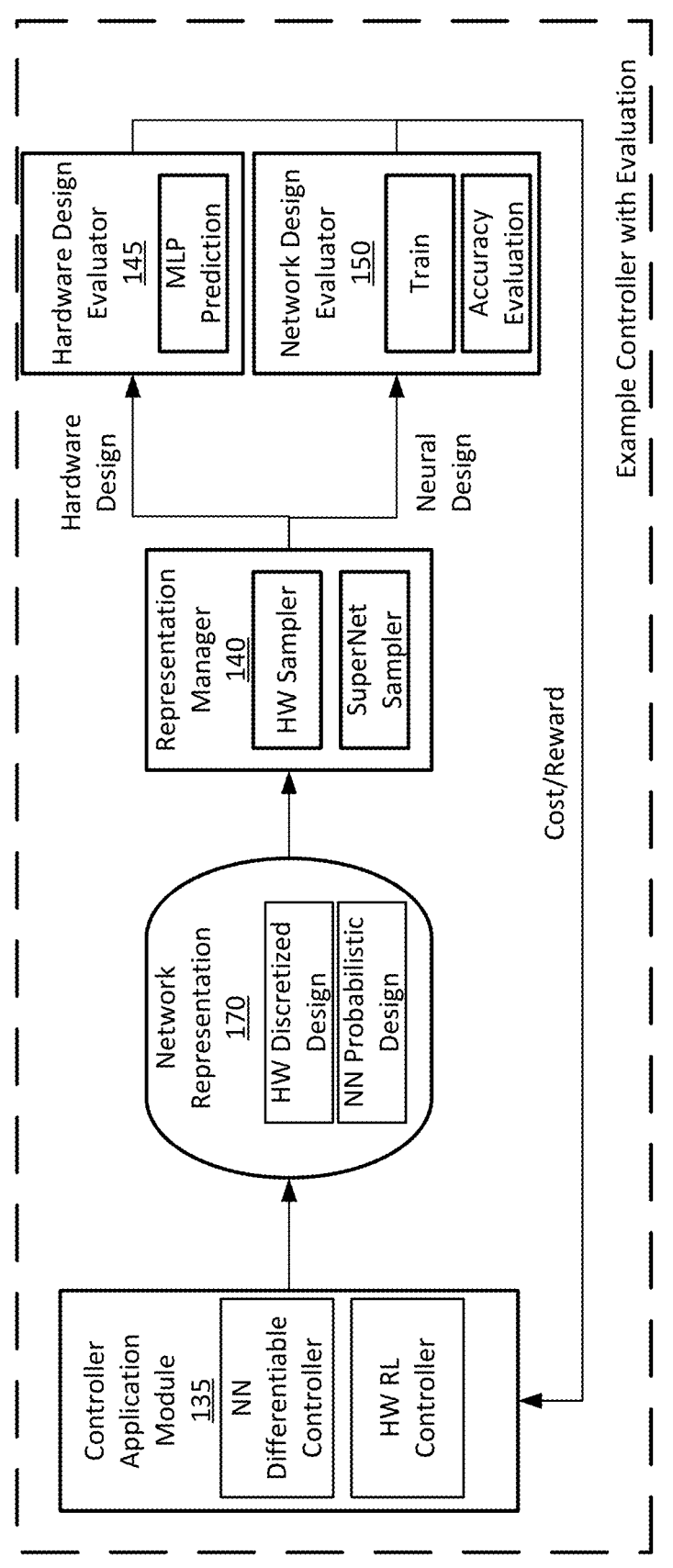
FIG. 5 shows an example flow for a particular controller, according to one embodiment.

FIG. 5 shows an example flow for a particular controller, according to one embodiment. In this example, the controller generates a HW discretized design and a NN probabilistic design as the network representation 170. In this example, the controller may apply a NN differentiable controller and a HW RL controller, for example as shown by joint controller 400A in FIG. 4. FIG. 5 demonstrates how the disclosed approach can implement joint optimization of neural network and hardware accelerator architecture. This is just an example of what a certain algorithm choice looks like in one embodiment, and additional and different hardware and model co-design algorithms may also be used.

In this example embodiment, a VTA hardware accelerator is used as the hardware search space (i.e., a configurable hardware accelerator) and the Direct Neural Architecture Search without Parameter Retraining (DSNAS) search space as the neural network search space (represented as a "Super-Net" of probabilistic network layers). In this example controller, a reinforcement learning (RL) controller is used for the HW design rather than a differentiable HW controller. After generating a HW discretized design and a NN probabilistic design as the network representation 170, the representation manager 140 samples the designs for evaluation. In this example, the representation manager 140 may use both the HW discretized design and a sample of the probabilistic NN design to generate a HW design to input as a hardware design for the hardware design evaluator 145. Similarly, from the NN probabilistic design (e.g., the Super-Net), the representation manager 140 samples from the NN probabilistic design (e.g., with a SuperNet Sampler), to extract a specific neural design for evaluation by the network design evaluator 150. In this example, the hardware design may be evaluated by the hardware design evaluator 145 using a trained MLP (multi-layer perceptron) predictor to estimate/predict performance characteristics of the hardware design. Similarly, the network design evaluator 150 in this example may train the sampled neural design with at least a portion of the training data from the search definition based on the defined task and loss definition and evaluate the results for accuracy (e.g., based on a validation set). The combined cost from the hardware and network designs are returned to the controller application module 135 for a further iteration of the design. In some embodiments, when the representation includes multiple designs (e.g., a population or a probabilistic design), the representation manager 140 may select/sample several designs for evaluation by the design evaluators before further network representation generation by the controller.

As an example of the benefit of evaluating several controllers, the example search space and controller of FIG. 5 shows the benefits of the search space optimization disclosed herein. In this example of the configurable VTA hardware accelerator and DSNAS "SuperNet" as a search space, while the neural network search space can be explored effectively with differentiable neural architecture search, using a differentiable method to optimize the hardware accelerator typically fails as a majority of the VTA hardware accelerator design choices are not realizable in practice. As a result, controllers which attempt to apply a differentiable controller to the search space may yield poor results when evaluating this search space (or subspaces thereof). By evaluating a variety of controllers to determine the controllers that actually yield an effective network design in the search subspace, the search space analyzer 130 may automatically evaluate and select a controller such as shown in FIG. 5 for evaluating this type of search space. By evaluating a variety of types of joint optimization controllers, including differentiable and other optimization algorithms, the search space analyzer is capable of automatically determining the efficacy of the various joint algorithms and selecting a non-differentiable controller when such a controller yields ineffective results. Further, the search space analyzer 130 may identify such a controller automatically and without expert intervention. Using the framework discussed above for applying various controllers to identify designs, FIGS. 6 and 7 provide further examples for a search space analyzer to explore candidate controllers for use to optimize a search space.

Subspace Exploration

FIG. 6 shows an example flow for evaluating candidate controllers for a search space, according to one embodiment. This process may be performed, for example, by search space analyzer 130. In this example, to select a controller for optimizing the search space, the search space analyzer 130 evaluates performance of candidate controllers on a plurality of search subspaces of the space to select a controller to optimize the search space as a whole. In this example, the search space analyzer 130 selects (e.g., samples) 600 a search subspace 610 from the overall search space from the search definition 110. The search subspace describes a portion of the neural search space and a portion of the hardware search space, thus providing a relatively smaller area for evaluation by the candidate controllers 620 to demonstrate the relative performance of different candidate controllers 620. In addition, the search subspace may be specified of a size such that the individual network designs within the subspace are enumerable and can be evaluated. The search subspace 610 is provided to plurality of candidate controllers 620 to develop respective controller optimized designs 630. In this example, three candidate controllers 620A-C are shown with respective controller optimized designs 630A-C, although various embodiments may use more or fewer than three candidate controllers. The candidate controllers 620 may be selected from the controller store 160, which may include all potential controllers for the search space (or search subspace) or may be a portion of such controllers based on prior controller performance on search spaces (or subspaces) similar to the search subspace 610. Such controllers may include, e.g., joint controllers discussed with respect to FIGS. 3-4. Based on the controller, objective function, etc., each controller may generate, evaluate, and update designs based on the particular optimization algorithms of the candidate controller 620. The controllers may be applied to evaluate the search subspace as discussed above and yield respective controller optimized designs 630.

In this example, the individual subspace configurations are enumerated within the search subspace and individually evaluated 640. As such, in this example the search space analyzer may evaluate the entire search subspace using enumeration to determine the relative performance of network designs in the search subspace. The subspace configurations (i.e., individual architecture designs) may be evaluated by the search space analyzer using the neural network and hardware evaluators and based on an objective of the search definition. From the various subspace configurations, the optimal subspace design 650 may be determined and thus used to score 660 the relative controller optimized designs 630 based on the relative performance of the controller optimized design relative to the optimal subspace design 650. In other embodiments, rather than enumerating the subspace configurations and identifying an optimal subspace design 650, the controller optimized designs 630 are scored and ranked relative to one another. For example, the candidate controllers 620 may be ranked according to performance of the respective controller optimized designs 630 and scores may be assigned based on the ranking or the relative performance of a controller optimized design 630 relative to the highest-ranking (e.g., best-performing) design.

After scoring the candidate controllers 620 for a particular search subspace, additional search subspaces may be selected for further scoring, such that the candidate controllers may be scored with respect to a plurality of subspaces. The search subspaces may be randomly selected from the search space or may be selected to evaluate a range of different regions of the search space. After a sufficient number of subspaces are evaluated, a controller may be selected 670 from the candidate controllers 620 for optimizing the space as a whole (for which it is generally impractical to enumerate network configurations). To select the controller, the search space analyzer may select the controller which most frequently scores well across the various subspaces or has the highest mean score, among other selection methods based on the scoring. While FIG. 6 shows that a plurality of candidate controllers may each generate an optimized design, in other embodiments the search space analyzer 130 may instead evaluate candidate controllers sequentially according to an exploration order. evaluate individual optimizes a design FIG. 7 shows an additional example for search space exploration of a plurality of candidate controllers using an exploration order, according to one embodiment. In this example, the candidate controllers may be evaluated in a sequence of expected efficacy of the candidate controllers. The sequence may be specified by a developer of the architecture search system 100 or may be automatically developed based on the historical performance of controllers with respect to search spaces or search subspaces. Thus, the evaluation of a search subspace may be performed as shown in FIG. 6 (e.g., to evaluate a plurality of candidate controllers in parallel) when little data or expectation is known about the candidate controllers' expected performance, while the example of FIG. 7 may be used when sufficient data indicates an expected performance of the controllers. In the example of FIG. 7, each candidate controller may be evaluated in an exploration order, which may correspond to expected performance or efficacy of the candidate controllers.

As discussed with respect to FIG. 6, a sampled subspace 710 may be selected 700 from the overall search space. In the example of FIG. 7, three candidate controllers are included in the exploration order; in practice additional or fewer candidate controllers may be used. In this example, rather than evaluate all candidate controllers, a first candidate controller is applied 720 to the search subspace to identify an optimized design as indicated by the first candidate controller, which is evaluated with respect to a quality threshold. When the optimized design meets the quality threshold (e.g., is "good"), the first candidate controller may be selected for the subspace without evaluating further candidate controllers, and the result is recorded 750 for the selected candidate controller. In one embodiment, the recorded results may include a register that accumulates the number of subspaces for which each candidate controller meets the quality threshold. The quality threshold may be based on the objective of the search definition or other metrics. As discussed with respect to FIG. 6, a controller optimized design may be developed by applying the first candidate controller and the controller optimized design may be compared with an optimal subspace design determined by enumerating subspace configurations. When the controller optimized design performs sufficiently similar to the optimal subspace design, the candidate controller may be considered to meet the quality threshold. As such, the performance of the candidate controller may be based on an objective performance metric or may be relative to an optimal subspace design.

When the quality threshold is not met (e.g., the controller optimized design is not good), the next candidate controller in the exploration order is evaluated. As shown in FIG. 7, a second candidate controller is applied 730 when the first candidate controller does not meet the quality threshold. Similarly, the second candidate controller may meet the quality threshold, in which case it is selected and recorded 750 as the optimal candidate for the subspace or may not meet the threshold, in which case the next candidate controller, here the third candidate controller, is applied 740 and evaluated. If all candidate controllers in the exploration order are evaluated, a result may be recorded that no candidate controllers were sufficiently high-quality, or the designs of each candidate controller may be evaluated relative to one another, such that the best-performing of the candidate controllers may be indicated as the best-performing candidate controller for the subspace. In the example of FIG. 7, by using an exploration order, in some circumstances the time to evaluate a subspace may be dramatically reduced when a candidate early in the exploration order is sufficiently high quality, and in some circumstances evaluation of a single candidate controller may be sufficient to score the search subspace. As with the example of FIG. 6, several subspaces may be sampled, after which a controller that scores well with respect to the plurality of sampled subspaces is selected for optimizing the search space as a whole.

FIG. 7 thus illustrates a way of analyzing different algorithms on the input search space and utilizing this analysis to multiplex search algorithms. This search space analyzer presents a method of evaluating the search space efficiently to determine the best method of optimizing hardware and neural network architectures. Particularly, an exploration order (e.g., a decision tree) can learn the right order of approach to sub-sample the search space for analysis. Such an order need not be static but can be automatically modified over time to minimize run-time of the search space analyzer.

Using the subspace exploration and by interfacing a search space analyzer with the overall framework which can automatically and cheaply identify the right interfacing and multiplexing of the components of the framework, improved solutions for search space, task, and hardware can be automatically identified. Stated another way, this allows for automatic selection of controllers (i.e., optimizers) for a given search space. Other approaches for solving difficult search spaces (e.g., undifferentiable search spaces), may take many months of exploration which could have been automated by subsampling the neural and hardware search space and analyzing the nature of the problem to choose the best algorithms for joint exploration of hardware and neural network architecture as discussed herein. The solution proposed here allows automation of the design space exploration by subsampling the design space and testing the efficacy of a range of search algorithms.

Example Computer Modeling

Figure 8:
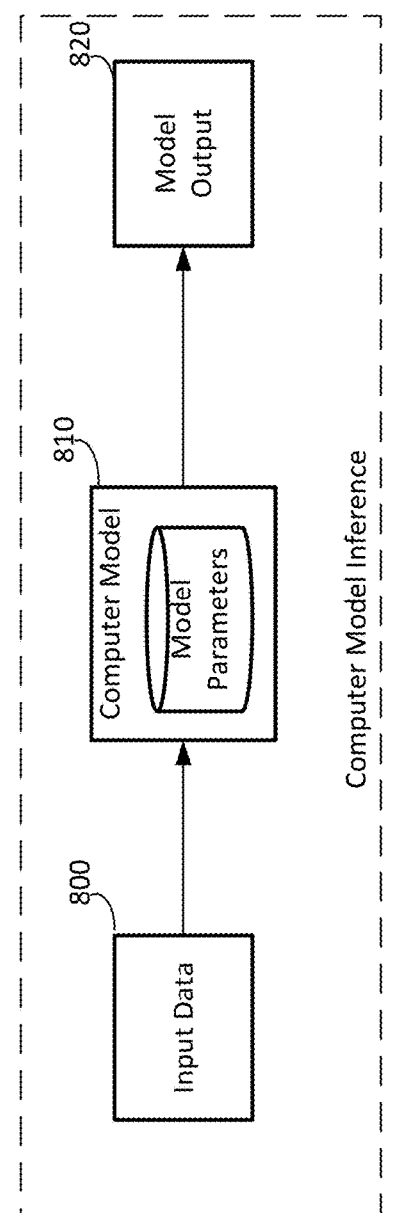
FIG. 8 shows example computer model inference and computer model training.
Figure 8:
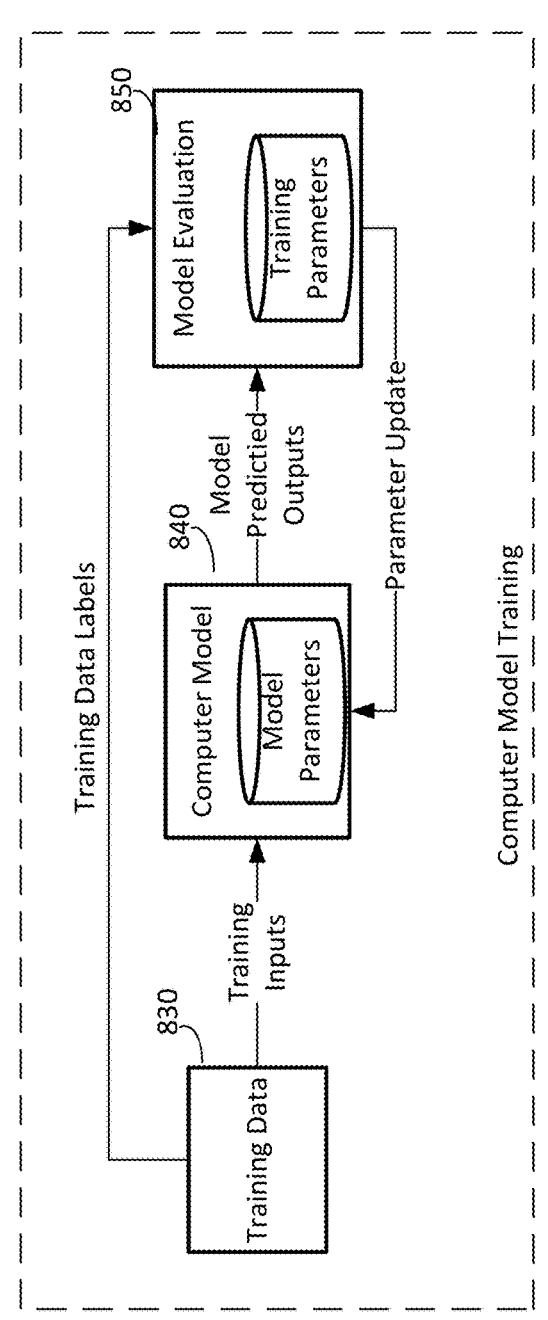

FIG. 8 shows example computer model inference and computer model training. Computer model inference refers to the application of a computer model 810 to a set of input data 800 to generate an output or model output 820. The computer model 810 determines the model output 820 based on parameters of the model, also referred to as model parameters. The parameters of the model may be determined based on a training process that finds an optimization of the model parameters, typically using training data and desired outputs of the model for the respective training data as discussed below. The output of the computer model may be referred to as an "inference" because it is a predictive value based on the input data 800 and based on previous example data used in the model training.

The input data 800 and the model output 820 vary according to the particular use case. For example, for computer vision and image analysis, the input data 800 may be an image having a particular resolution, such as 75×75 pixels, or a point cloud describing a volume. In other applications, the input data 800 may include a vector, such as a sparse vector, representing information about an object. For example, in recommendation systems, such a vector may represent user-object interactions, such that the sparse vector indicates individual items positively rated by a user. In addition, the input data 800 may be a processed version of another type of input object, for example representing various features of the input object or representing preprocessing of the input object before input of the object to the computer model 810. As one example, a 1024×1024 resolution image may be processed and subdivided into individual image portions of 64×64, which are the input data 800 processed by the computer model 810. As another example, the input object, such as a sparse vector discussed above, may be processed to determine an embedding or another compact representation of the input object that may be used to represent the object as the input data 800 in the computer model 810. Such additional processing for input objects may themselves be learned representations of data, such that another computer model processes the input objects to generate an output that is used as the input data 800 for the computer model 810. Although not further discussed here, such further computer models may be independently or jointly trained with the computer model 810.

As noted above, the model output 820 may depend on the particular application of the computer model 810, and represent recommendation systems, computer vision systems, classification systems, labeling systems, weather prediction, autonomous control, and any other type of modeling output/prediction.

The computer model 810 includes various model parameters, as noted above, that describe the characteristics and functions that generate the model output 820 from the input data 800. In particular, the model parameters may include a model structure, model weights, and a model execution environment. The model structure may include, for example, the particular type of computer model 810 and its structure and organization. For example, the model structure may designate a neural network, which may be comprised of multiple layers, and the model parameters may describe individual types of layers included in the neural network and the connections between layers (e.g., the output of which layers constitute inputs to which other layers). Such networks may include, for example, feature extraction layers, convolutional layers, pooling/dimensional reduction layers, activation layers, output/predictive layers, and so forth. While in some instances the model structure may be determined by a designer of the computer model, in other examples, the model structure itself may be learned via a training process and may thus form certain "model parameters" of the model.

The model weights may represent the values with which the computer model 810 processes the input data 800 to the model output 820. Each portion or layer of the computer model 810 may have such weights. For example, weights may be used to determine values for processing inputs to determine outputs at a particular portion of a model. Stated another way, for example, model weights may describe how to combine or manipulate values of the input data 800 or thresholds for determining activations as output for a model. As one example, a convolutional layer typically includes a set of convolutional "weights," also termed a convolutional kernel, to be applied to a set of inputs to that layer. These are subsequently combined, typically along with a "bias" parameter, and weights for other transformations to generate an output for the convolutional layer.

The model execution parameters represent parameters describing the execution conditions for the model. In particular, aspects of the model may be implemented on various types of hardware or circuitry for executing the computer model. For example, portions of the model may be implemented in various types of circuitry, such as general-purpose circuity (e.g., a general CPU), circuity specialized for certain computer model functions (e.g., a GPU or programmable Multiply-and-Accumulate circuit) or circuitry specially designed for the particular computer model application. In some configurations, different portions of the computer model 810 may be implemented on different types of circuitry. As discussed below, training of the model may include optimizing the types of hardware used for certain aspects of the computer model (e.g., co-trained), or may be determined after other parameters for the computer model are determined without regard to configuration executing the model. In another example, the execution parameters may also determine or limit the types of processes or functions available at different portions of the model, such as value ranges available at certain points in the processes, operations available for performing a task, and so forth.

Computer model training may thus be used to determine or "train" the values of the model parameters for the computer model 840. During training, the model parameters are optimized to "learn" values of the model parameters (such as individual weights, activation values, model execution environment, etc.), that improve the model parameters based on an optimization function that seeks to improve a cost function (also sometimes termed a loss function). Before training, the computer model 840 has model parameters that have initial values that may be selected in various ways, such as by a randomized initialization, initial values selected based on other or similar computer models, or by other means. During training, the model parameters are modified based on the optimization function to improve the cost/loss function relative to the prior model parameters.

In many applications, training data 830 includes a data set to be used for training the computer model 840. The data set varies according to the particular application and purpose of the computer model 840. In supervised learning tasks, the training data typically includes a set of training data labels that describe the training data and the desired output of the model relative to the training data. For example, for an object classification task, the training data may include individual images in which individual portions, regions or pixels in the image are labeled with the classification of the object. For this task, the training data may include a training data image depicting a dog and a person and a training data labels that label the regions of the image that include the dog and the person, such that the computer model is intended to learn to also label the same portions of that image as a dog and a person, respectively.

To train the computer model, a training module (not shown) applies the training inputs 830 to the computer model 840 to determine the outputs predicted by the model for the given training inputs 830. The training module, though not shown, is a computing module used for performing the training of the computer model by executing the computer model according to its inputs and outputs given the model's parameters and modifying the model parameters based on the results. The training module may apply the actual execution environment of the computer model 840, or may simulate the results of the execution environment, for example to estimate the performance, runtime, memory, or circuit area (e.g., if specialized hardware is used) of the computer model. The training module, along with the training data and model evaluation, may be instantiated in software and/or hardware by one or more processing devices such as the example computing device 1000 shown in FIG. 10. In various examples, the training process may also be performed by multiple computing systems in conjunction with one another, such as distributed/cloud computing systems.

After processing the training inputs according to the current model parameters for the computer model 840, the model's predicted outputs are evaluated 850 and the computer model is evaluated with respect to the cost function and optimized using an optimization function of the training model. Depending on the optimization function, particular training process and training parameters after the model evaluation are updated to improve the optimization function of the computer model. In supervised training (i.e., training data labels are available), the cost function may evaluate the model's predicted outputs relative to the training data labels and to evaluate the relative cost or loss of the prediction relative to the "known" labels for the data. This provides a measure of the frequency of correct predictions by the computer model and may be measured in various ways, such as the precision (frequency of false positives) and recall (frequency of false negatives). The cost function in some circumstances may evaluate may also evaluate other characteristics of the model, for example the model complexity, processing speed, memory requirements, physical circuit characteristics (e.g., power requirements, circuit throughput)

and other characteristics of the computer model structure and execution environment (e.g., to evaluate or modify these model parameters).

After determining results of the cost function, the optimization function determines a modification of the model parameters to improve the cost function for the training data. Many such optimization functions are known to one skilled on the art. Many such approaches differentiate the cost function with respect to the parameters of the model and determine modifications to the model parameters that thus improves the cost function. The parameters for the optimization function, including algorithms for modifying the model parameters are the training parameters for the optimization function. For example, the optimization algorithm may use gradient descent (or its variants), momentum-based optimization, or other optimization approaches used in the art and as appropriate for the particular use of the model. The optimization algorithm thus determines the parameter updates to the model parameters. In some implementations, the training data is batched and the parameter updates are iteratively applied to batches of the training data. For example, the model parameters may be initialized, then applied to a first batch of data to determine a first modification to the model parameters. The second batch of data may then be evaluated with the modified model parameters to determine a second modification to the model parameters, and so forth, until a stopping point, typically based on either the amount of training data available or the incremental improvements in model parameters are below a threshold (e.g., additional training data no longer continues to improve the model parameters). Additional training parameters may describe the batch size for the training data, a portion of training data to use as validation data, the step size of parameter updates, a learning rate of the model, and so forth. Additional techniques may also be used to determine global optimums or address nondifferentiable model parameter spaces.

Figure 9:
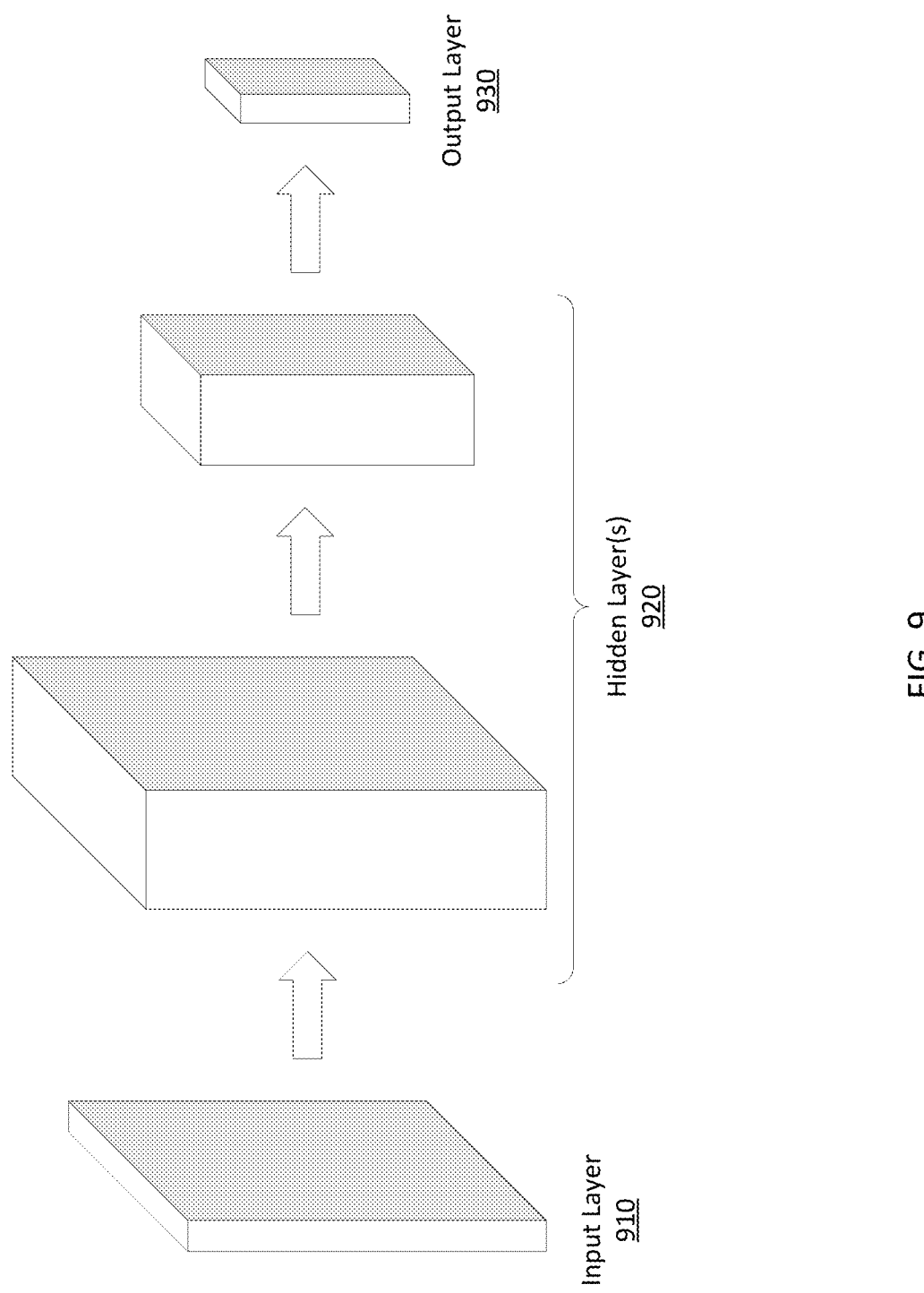
FIG. 9 illustrates an example neural network architecture.

FIG. 9 illustrates an example neural network architecture. In general, a neural network includes an input layer 910, one or more hidden layers 920, and an output layer 930. The values for data in each layer of the network is generally determined based on one or more prior layers of the network. Each layer of a network generates a set of values, termed "activations" that represent the output values of that layer of a network and may be the input to the next layer of the network. For the input layer 910, the activations are typically the values of the input data, although the input layer 910 may represent input data as modified through one or more transformations to generate representations of the input data. For example, in recommendation systems, interactions between users and objects may be represented as a sparse matrix. Individual users or objects may then be represented as an input layer 910 as a transformation of the data in the sparse matrix relevant to that user or object. The neural network may also receive the output of another computer model (or several), as its input layer 910, such that the input layer 910 of the neural network shown in FIG. 9 is the output of another computer model. Accordingly, each layer may receive a set of inputs, also termed "input activations," representing activations of one or more prior layers of the network and generate a set of outputs, also termed "output activations" representing the activation of that layer of the network. Stated another way, one layer's output activations become the input activations of another layer of the network (except for the final output layer of 930 of the network.

Each layer of the neural network typically represents its output activations (i.e., also termed its outputs) in a matrix, which may be 1, 2, 3, or n-dimensional according to the particular structure of the network. As shown in FIG. 9, the dimensionality of each layer may differ according to the design of each layer. The dimensionality of the output layer 930 depend on the characteristics of the prediction made by the model. For example, a computer model for multi-object classification may generate an output layer 930 having a one-dimensional array in which each position in the array represents the likelihood of a different classification for the input layer 910. In another example for classification of portions of an image, the input layer 910 may be an image having a resolution, such as 512×512, and the output layer may be a 512×512×n matrix in which the output layer 930 provides n classification predictions for each of the input pixels, such that the corresponding position of each pixel in the input layer 910 in the output layer 930 is an n-dimensional array corresponding to the classification predictions for that pixel.

The hidden layers 920 provide output activations that variously characterize the input layer 910 in various ways that assist in effectively generating the output layer 930. The hidden layers thus may be considered to provide additional features or characteristics of the input layer 910. Though two hidden layers are shown in FIG. 9, in practice any number of hidden layers may be provided in various neural network structures.

Each layer generally determines the output activation values of positions in its activation matrix based on the output activations of one or more previous layers of the neural network (which may be considered input activations to the layer being evaluated). Each layer applies a function to the input activations to generate its activations. Such layers may include fully-connected layers (e.g., every input is connected to every output of a layer), convolutional layers, deconvolutional layers, pooling layers, and recurrent layers. Various types of functions may be applied by a layer, including linear combinations, convolutional kernels, activation functions, pooling, and so forth. The parameters of a layer's function are used to determine output activations for a layer from the layer's activation inputs and are typically modified during the model training process. The parameters describing the contribution of a particular portion of a prior layer is typically termed a weight. For example, in some layers, the function is a multiplication of each input with a respective weight to determine the activations for that layer. For a neural network, the parameters for the model as a whole thus may include the parameters for each of the individual layers and in large-scale networks can include hundreds of thousands, millions, or more of different parameters.

As one example for training a neural network, the cost function is evaluated at the output layer 930. To determine modifications of the parameters for each layer, the parameters of each prior layer may be evaluated to determine respective modifications. In one example, the cost function (or "error") is backpropagated such that the parameters are evaluated by the optimization algorithm for each layer in sequence, until the input layer 910 is reached.

Example Devices

Figure 10:
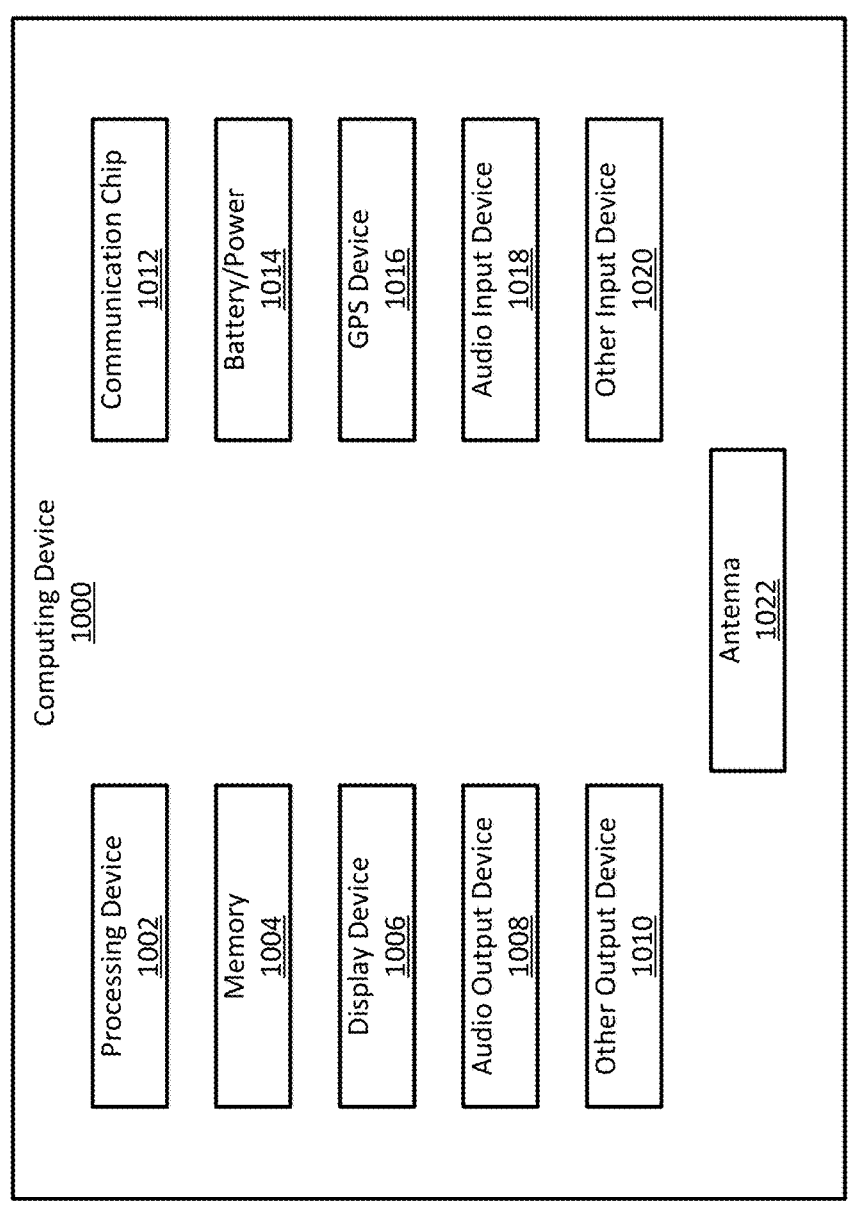
FIG. 10 is a block diagram of an example computing device that may include one or more components used for training, analyzing, or implementing a computer model in accordance with any of the embodiments disclosed herein.

FIG. 10 is a block diagram of an example computing device 1000 that may include one or more components used for training, analyzing, or implementing a computer model in accordance with any of the embodiments disclosed herein. For example, the computing device 1000 may include a training module for training a computer model and may include a trained computer model for executing functions of the computing device 1000, and in some circumstances may include specialized hardware and/or software for executing the computer model.

A number of components are illustrated in FIG. 10 as included in the computing device 1000, but any one or more of these components may be omitted or duplicated, as suitable for the application. In some embodiments, some or all of the components included in the computing device 1000 may be attached to one or more motherboards. In some embodiments, some or all of these components are fabricated onto a single system-on-a-chip (SoC) die.

Additionally, in various embodiments, the computing device 1000 may not include one or more of the components illustrated in FIG. 10, but the computing device 1000 may include interface circuitry for coupling to the one or more components. For example, the computing device 1000 may not include a display device 1006, but may include display device interface circuitry (e.g., a connector and driver circuitry) to which a display device 1006 may be coupled. In another set of examples, the computing device 1000 may not include an audio input device 1024 or an audio output device 1008 but may include audio input or output device interface circuitry (e.g., connectors and supporting circuitry) to which an audio input device 1024 or audio output device 1008 may be coupled.

The computing device 1000 may include a processing device 1002 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), application-specific ICs (ASICs), central processing units (CPUs), graphics processing units (GPUs), cryptoprocessors (specialized processors that execute cryptographic algorithms within hardware), server processors, or any other suitable processing devices. The computing device 1000 may include a memory 1004, which may itself include one or more memory devices such as volatile memory (e.g., dynamic random-access memory (DRAM)), nonvolatile memory (e.g., read-only memory (ROM)), flash memory, solid state memory, and/or a hard drive. The memory 1104 may include instructions executable by the processing device for performing methods and functions as discussed herein. Such instructions may be instantiated in various types of memory, which may include non-volatile memory and as stored on one or more non-transitory mediums. In some embodiments, the memory 1004 may include memory that shares a die with the processing device 1002. This memory may be used as cache memory and may include embedded dynamic random-access memory (eDRAM) or spin transfer torque magnetic random-access memory (STT-MRAM).

In some embodiments, the computing device 1000 may include a communication chip 1012 (e.g., one or more communication chips). For example, the communication chip 1012 may be configured for managing wireless communications for the transfer of data to and from the computing device 1000. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1012 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1012 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. The communication chip 1012 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1012 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1012 may operate in accordance with other wireless protocols in other embodiments. The computing device 1000 may include an antenna 1022 to facilitate wireless communications and/or to receive other wireless communications (such as AM or FM radio transmissions).

In some embodiments, the communication chip 1012 may manage wired communications, such as electrical, optical, or any other suitable communication protocols (e.g., the Ethernet). As noted above, the communication chip 1012 may include multiple communication chips. For instance, a first communication chip 1012 may be dedicated to shorter-range wireless communications such as Wi-Fi or Bluetooth, and a second communication chip 1012 may be dedicated to longer-range wireless communications such as global positioning system (GPS), EDGE, GPRS, CDMA, WiMAX, LTE, EV-DO, or others. In some embodiments, a first communication chip 1012 may be dedicated to wireless communications, and a second communication chip 1012 may be dedicated to wired communications.

The computing device 1000 may include battery/power circuitry 1014. The battery/power circuitry 1014 may include one or more energy storage devices (e.g., batteries or capacitors) and/or circuitry for coupling components of the computing device 1000 to an energy source separate from the computing device 1000 (e.g., AC line power).

The computing device 1000 may include a display device 1006 (or corresponding interface circuitry, as discussed above). The display device 1006 may include any visual indicators, such as a heads-up display, a computer monitor, a projector, a touchscreen display, a liquid crystal display (LCD), a light-emitting diode display, or a flat panel display, for example.

The computing device 1000 may include an audio output device 1008 (or corresponding interface circuitry, as discussed above). The audio output device 1008 may include any device that generates an audible indicator, such as speakers, headsets, or earbuds, for example.

The computing device 1000 may include an audio input device 1024 (or corresponding interface circuitry, as discussed above). The audio input device 1024 may include any device that generates a signal representative of a sound, such as microphones, microphone arrays, or digital instruments (e.g., instruments having a musical instrument digital interface (MIDI) output).

The computing device 1000 may include a GPS device 1018 (or corresponding interface circuitry, as discussed above). The GPS device 1018 may be in communication with a satellite-based system and may receive a location of the computing device 1000, as known in the art.

The computing device 1000 may include an other output device 1010 (or corresponding interface circuitry, as discussed above). Examples of the other output device 1010 may include an audio codec, a video codec, a printer, a wired or wireless transmitter for providing information to other devices, or an additional storage device.

The computing device 1000 may include an other input device 1020 (or corresponding interface circuitry, as discussed above). Examples of the other input device 1020 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1000 may have any desired form factor, such as a hand-held or mobile computing device (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computing device, a server or other networked computing component, a printer, a scanner, a monitor, a set-top box, an entertainment control unit, a vehicle control unit, a digital camera, a digital video recorder, or a wearable computing device. In some embodiments, the computing device 1000 may be any other electronic device that processes data.

SELECT EXAMPLES

The following paragraphs provide various examples of the embodiments disclosed herein.

Example 1 provides for a method including receiving a search definition for a joint hardware-neural network architecture search, including a hardware search space and a neural search space; for each search subspace of a plurality of search subspaces, each search subspace including a portion of the hardware search space and a portion of the neural search space: identifying an optimal subspace design from a plurality of subspace configurations within the search subspace; scoring one or more of a plurality of candidate controllers by comparing a controller-optimized design within the search subspace with the optimal subspace design; and selecting an optimization controller from the plurality of candidate controllers based on the scoring of the plurality of the candidate controllers for the plurality of search subspaces.

Example 2 provides for the method of example 1, further including determining an optimized hardware-neural network design by applying the search definition to the selected optimization controller.

Example 3 provides for the method of any of examples 1-2, wherein for each search subspace, the scoring includes all of the plurality of candidate controllers.

Example 4 provides for the method of any of examples 1-2, wherein, for each subspace, the plurality of candidate controllers are scored in an exploration order, wherein for each candidate controller in the exploration order, the design for the candidate controller is evaluated with respect to a quality threshold, such that when the quality threshold is met, a subsequent controller in the exploration order is not evaluated for the sampled subspace, and when the quality threshold is not met, the next controller in the exploration order is evaluated.

Example 5 provides for the method of any of examples 1-4, wherein the optimal subspace design is determined from a plurality of subspace configurations by enumerating all subspace configurations within the search subspace.

Example 6 provides for the method of any of example 1-5, wherein one or more of the plurality of candidate controllers include interfacing between a hardware and a neural network controller.

Example 7 provides for the method of example 6, wherein the hardware and/or neural network controller include differentiable algorithms, genetic algorithms, and/or reinforcement algorithms.

Example 8 provides for the method of any of examples 1-7, wherein the plurality of candidate controllers generate a hardware and neural network representation, including one or more of discrete designs, probabilistic designs, and a design population.

Example 9 provides for the method of any of examples 1-8, wherein the scoring is based on an objective included in the search definition.

Example 10 provides for a system comprising: a processor; and a non-transitory computer-readable storage medium containing computer program code for execution by the processor for: receiving a search definition for a joint hardware-neural network architecture search, including a hardware search space and a neural search space; for each search subspace of a plurality of search subspaces, each search subspace including a portion of the hardware search space and a portion of the neural search space: identifying an optimal subspace design from a plurality of subspace configurations within the search subspace; scoring one or more of a plurality of candidate controllers by comparing a controller-optimized design within the search subspace with the optimal subspace design; and selecting an optimization controller from the plurality of candidate controllers based on the scoring of the plurality of the candidate controllers for the plurality of search subspaces.

Example 11 provides for the system of example 10, the computer program code further comprising determining an optimized hardware-neural network design by applying the search definition to the selected optimization controller.

Example 12 provides for the system of any of examples 10-11, wherein for each search subspace, the scoring includes all of the plurality of candidate controllers.

Example 13 provides for the system of any of examples 10-11, wherein, for each subspace, the plurality of candidate controllers are scored in an exploration order, wherein for each candidate controller in the exploration order, the design for the candidate controller is evaluated with respect to a quality threshold, such that when the quality threshold is met, a subsequent controller in the exploration order is not evaluated for the sampled subspace, and when the quality threshold is not met, the next controller in the exploration order is evaluated.

Example 14 provides for the system of any of examples 10-13, wherein the optimal subspace design is determined from a plurality of subspace configurations by enumerating all subspace configurations within the search subspace.

Example 15 provides for the system of any of examples 10-14, wherein one or more of the plurality of candidate controllers include interfacing between a hardware and a neural network controller.

Example 16 provides for the method of example 15, wherein the hardware and/or neural network controller include differentiable algorithms, genetic algorithms, and/or reinforcement algorithms.

Example 17 provides for the system of any of examples 10-16, wherein the plurality of candidate controllers generate a hardware and neural network representation, including one or more of discrete designs, probabilistic designs, and a design population.

Example 18 provides for the system of any of examples 10-17, wherein the scoring is based on an objective included in the search definition.

Example 19 provides for a non-transitory computer-readable storage medium containing instructions executable by a processor for: receiving a search definition for a joint hardware-neural network architecture search, including a hardware search space and a neural search space; for each search subspace of a plurality of search subspaces, each search subspace including a portion of the hardware search space and a portion of the neural search space: identifying an optimal subspace design from a plurality of subspace configurations within the search subspace; scoring one or more of a plurality of candidate controllers by comparing a controller-optimized design within the search subspace with the optimal subspace design; and selecting an optimization controller from the plurality of candidate controllers based on the scoring of the plurality of the candidate controllers for the plurality of search subspaces.

Example 20 provides for the non-transitory computer-readable storage medium of example 19, the instructions further being executable for determining an optimized hardware-neural network design by applying the search definition to the selected optimization controller.

Example 21 provides for the non-transitory computer-readable storage medium of any of examples 19-20, wherein for each search subspace, the scoring includes all of the plurality of candidate controllers.

Example 22 provides for the non-transitory computer-readable storage medium of any of example 19-20, wherein, for each subspace, the plurality of candidate controllers are scored in an exploration order, wherein for each candidate controller in the exploration order, the design for the candidate controller is evaluated with respect to a quality threshold, such that when the quality threshold is met, a subsequent controller in the exploration order is not evaluated for the sampled subspace, and when the quality threshold is not met, the next controller in the exploration order is evaluated.

Example 23 provides for the non-transitory computer-readable storage medium of any of example 19-22, wherein the optimal subspace design is determined from a plurality of subspace configurations by enumerating all subspace configurations within the search subspace.

Example 24 provides for the non-transitory computer-readable storage medium of any of examples 19-23, wherein one or more of the plurality of candidate controllers include interfacing between a hardware and a neural network controller.

Example 25 provides for the non-transitory computer-readable storage medium of example 24, wherein the hardware and/or neural network controller include differentiable algorithms, genetic algorithms, and/or reinforcement algorithms.

Example 26 provides for the non-transitory computer-readable storage medium of any of examples 19-25, wherein the plurality of candidate controllers generate a hardware and neural network representation, including one or more of discrete designs, probabilistic designs, and a design population.

Example 27 provides for the non-transitory computer-readable storage medium of any of examples 19-26, wherein the scoring is based on an objective included in the search definition.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

What is claimed is:

1. A method for optimizing a hardware-network architecture search for automated computer models, comprising:

sampling a plurality of search subspaces from a search space of neural network architectures and hardware architectures, each search subspace including a portion of the search space;

determining controller-optimized designs for the plurality of search subspaces using a plurality of candidate controllers, wherein the plurality of candidate controllers identify the controller-optimized designs using different optimization algorithms, wherein a controller-optimized design is a hardware-neural network design;

scoring the plurality of candidate controllers by determining a plurality of scores for a single candidate controller, wherein determining the plurality of scores for the single candidate controller comprises:

determining a first score for the single candidate controller based on one or more controller-optimized designs for a first search subspace and an optimal subspace design for the first search subspace, and determining a second score for the single candidate controller based on one or more controller-optimized designs for a second search subspace and an optimal subspace design for the second search subspace;

selecting an optimization controller from the plurality of candidate controllers based on the scoring;

determining a neural network architecture and hardware architecture by applying the selected optimization controller on at least part of the search space;

generating an automated computer model with the neural network architecture; and executing the automated computer model using a hardware device with the hardware architecture.

2. The method of claim 1, further comprising applying a search definition for the search space to the selected optimization controller, wherein the search definition specifies an objective of a task to be performed by the automated computer model.

3. The method of claim 1, wherein for each search subspace, the scoring includes all of the plurality of candidate controllers.

4. The method of claim 1, wherein, for each search subspace, the plurality of candidate controllers are scored in an exploration order, wherein for a particular candidate controller in the exploration order, a controller-optimized design for the particular candidate controller is evaluated with respect to a quality threshold, such that when the quality threshold is met, a subsequent controller in the exploration order is not evaluated for the search subspace, and when the quality threshold is not met, the next controller in the exploration order is evaluated.

5. The method of claim 1, wherein the optimal subspace design is determined from a plurality of subspace configurations by enumerating all subspace configurations within the search subspace.

6. The method of claim 1, wherein one or more of the plurality of candidate controllers include interfacing between a hardware controller and a neural network controller.

7. The method of claim 6, wherein the hardware controller or neural network controller includes differentiable algorithms, genetic algorithms, or reinforcement algorithms.

8. The method of claim 1, wherein the neural network architecture and hardware architecture include one or more of discrete designs, probabilistic designs, and a design population.

9. The method of claim 1, wherein the scoring is based on an objective included in the search definition.

10. A system comprising:

a processor; and a non-transitory computer-readable storage medium containing computer program code for execution by the processor for:

sampling a plurality of search subspaces from a search space of neural network architectures and hardware architectures, each search subspace including a portion of the search space, determining controller-optimized designs for the plurality of search subspaces using a plurality of candidate controllers, wherein the plurality of candidate controllers identify the controller-optimized designs using different optimization algorithms, wherein a controller-optimized design is a hardware-neural network design, scoring the plurality of candidate controllers by determining a plurality of scores for a single candidate controller, wherein determining the plurality of scores for the single candidate controller comprises:

determining a first score for the single candidate controller based on one or more controller-optimized designs for a first search subspace with and an optimal subspace design for the first search subspace, and determining a second score for the single candidate controller based on one or more controller-optimized designs for a second search subspace and an optimal subspace design for the second search subspace, selecting an optimization controller from the plurality of candidate controllers based on the scoring, determining a neural network architecture and hardware architecture by applying the selected optimization controller on at least part of the search space, generating an automated computer model with the neural network architecture, and executing the automated computer model using a hardware device with the hardware architecture.

11. The system of claim 10, wherein the computer program code is for further execution by the processor for applying a search definition for the search space to the selected optimization controller, wherein the search definition specifies an objective of a task to be performed by the automated computer model.

12. The system of claim 10, wherein for each search subspace, the scoring includes all of the plurality of candidate controllers.

13. The system of claim 10, wherein, for each search subspace, the plurality of candidate controllers are scored in an exploration order, wherein for a particular candidate controller in the exploration order, a controller-optimized design for the particular candidate controller is evaluated with respect to a quality threshold, such that when the quality threshold is met, a subsequent controller in the exploration order is not evaluated for the search subspace, and when the quality threshold is not met, the next controller in the exploration order is evaluated.

14. The system of claim 10, wherein the optimal subspace design is determined from a plurality of subspace configurations by enumerating all subspace configurations within the search subspace.

15. The system of claim 10, wherein one or more of the plurality of candidate controllers include interfacing between a hardware controller and a neural network controller.

16. The system of claim 15, wherein the hardware controller or neural network controller includes differentiable algorithms, genetic algorithms, or reinforcement algorithms.

17. The system of claim 10, wherein the neural network architecture and hardware architecture include one or more of discrete designs, probabilistic designs, and a design population.

18. The system of claim 10, wherein the scoring is based on an objective included in the search definition.

19. A non-transitory computer-readable storage medium containing instructions executable by a processor for:

sampling a plurality of search subspaces from a search space of neural network architectures and hardware architectures, each search subspace including a portion of the search space;

determining controller-optimized designs for the plurality of search subspaces using a plurality of candidate controllers, wherein the plurality of candidate controllers identify the controller-optimized designs using different optimization algorithms, wherein a controller-optimized design is a hardware-neural network design;

scoring the plurality of candidate controllers by determining a plurality of scores for a single candidate controller, wherein determining the plurality of scores for the single candidate controller comprises:

determining a first score for the single candidate controller based on one or more controller-optimized designs for a first search subspace and an optimal subspace design for the first search subspace, and determining a second score for the single candidate controller based on one or more controller-optimized designs for a second search subspace and an optimal subspace design for the second search subspace;

selecting an optimization controller from the plurality of candidate controllers based on the scoring;

determining a neural network architecture and hardware architecture by applying the selected optimization controller on at least part of the search space;

generating an automated computer model with the neural network architecture; and executing the automated computer model using a hardware device with the hardware architecture.

20. The non-transitory computer-readable storage medium of claim 19, wherein the instructions are further executable for applying a search definition for the search space to the selected optimization controller, wherein the search definition specifies an objective of a task to be performed by the automated computer model.

21. The non-transitory computer-readable storage medium of claim 19, wherein for each search subspace, the scoring includes all of the plurality of candidate controllers.

22. The non-transitory computer-readable storage medium of claim 19, wherein, for each search subspace, the plurality of candidate controllers are scored in an exploration order, wherein for a particular candidate controller in the exploration order, a controller-optimized design for the particular candidate controller is evaluated with respect to a quality threshold, such that when the quality threshold is met, a subsequent controller in the exploration order is not evaluated for the search subspace, and when the quality threshold is not met, the next controller in the exploration order is evaluated.

23. The non-transitory computer-readable storage medium of claim 19, wherein the optimal subspace design is determined from a plurality of subspace configurations by enumerating all subspace configurations within the search subspace.

24. The non-transitory computer-readable storage medium of claim 19, wherein one or more of the plurality of candidate controllers include interfacing between a hardware controller and a neural network controller.

25. The non-transitory computer-readable storage medium of claim 24, wherein the hardware controller or neural network controller includes differentiable algorithms, genetic algorithms, or reinforcement algorithms.

* * * * *